May 2, 1944. W. H. GREEN 2,348,126
SEWAGE PURIFICATION
Filed July 24, 1941 2 Sheets-Sheet 1
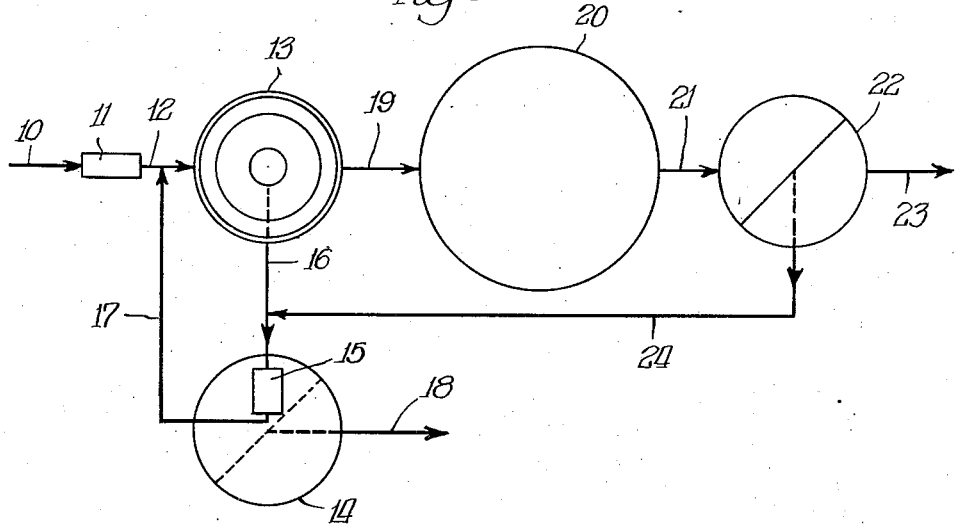
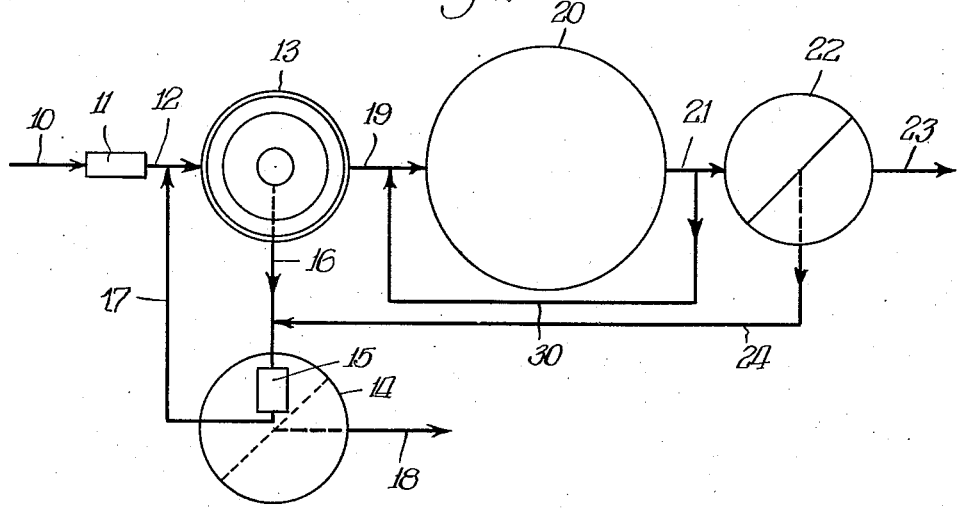
INVENTOR.
Walter H. Green
BY

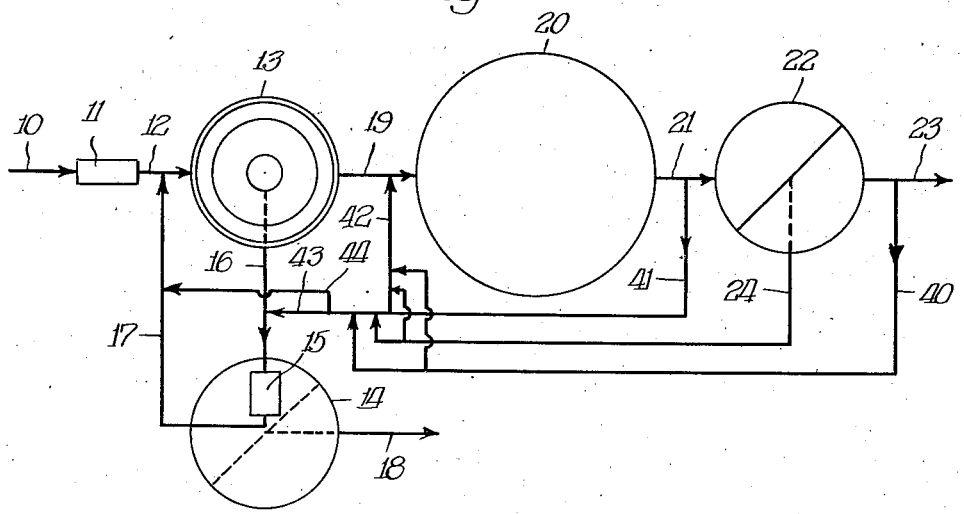
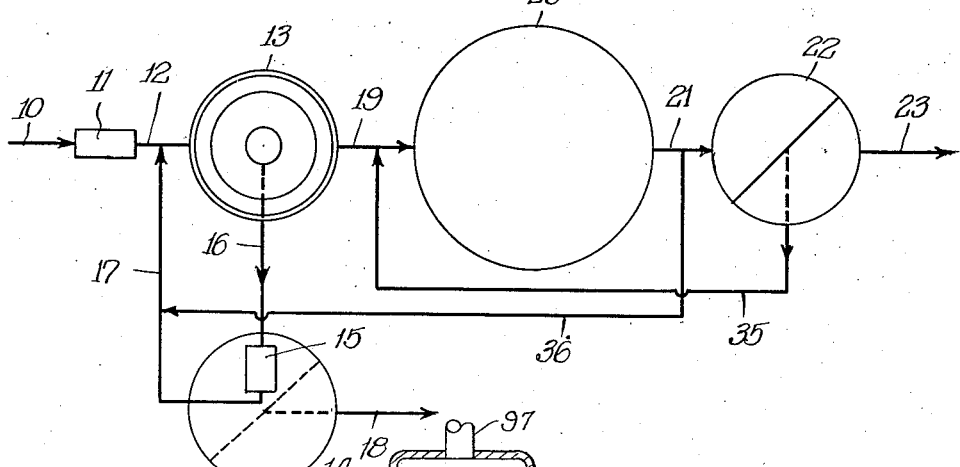
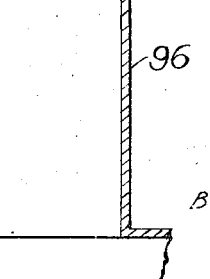

Patented May 2, 1944

2,348,126

UNITED STATES PATENT OFFICE 2,348,126

SEWAGE PURIFICATION

Walter H. Green, Chicago, Ill., assignor to Infilco Incorporated, a corporation of Delaware Application July 24, 1941, Serial No. 403,863

15 Claims. (Cl. 210—5)

This invention relates to the improvement of sewage treatment.

The term sewage as used herein is intended to include not only domestic sewage but other more or less similar wastes containing putrescible matter. I will describe my invention in connection with the purification of sewage such as municipal sewage, since this is the most common application, involving the greater number of plants and the greater volume of liquid to be treated.

The purification of municipal sewage involves many difficult problems. Such sewage contains organic matter some of which is in solution, some present in colloidal form and some as suspended particles. Sewage purification as herein considered has to do with these organic matters, it being assumed that grit and other coarse matter has been previously separated as by a grit chamber or screen. The purpose of the present treatment is to remove these organic solids or to change them to less objectionable forms. As they exist in raw sewage and during the greater part of the treatment they are readily putrescent. The usual treatment, and that herein contemplated, includes clarification and also biological action. By the latter, organic matter is oxidized or changed by the action of living organisms to forms that are unobjectionable or less objectionable because more stable. Advantageously, and as herein proposed, such biological action is carried out in two separated steps, employing different types of organisms. These biological steps are carried out in parallel rather than in tandem, that is, the raw sewage is divided into two parts in a preliminary step and each part then passed to its type of treatment, although a residue from one of these steps may then be sent to the other. The effluent from one of these steps may in whole or in part be returned to an earlier step or stage of the treatment either for its further purification or to promote the action in a prior step. The nature of the process, as a whole and of the various steps and stages, is such that a change in one place may and ordinarily will effect change elsewhere. This is bad from the standpoint of requiring careful operation and control but good in that it permits broad benefits being obtained from a restricted change. It is apparent that any such process, although carried out in various and separated steps and numerous pieces of apparatus, is nevertheless closely tied together and the several parts closely operatively related.

In my copending application entitled "Sewage clarification," Serial No. 403,861, filed July 24, 1941, I disclose an improved clarifying apparatus and process. In my copending application entitled "Sewage treatment," Serial No. 403,862, filed July 24, 1941, I disclose the combination of the improved clarifying apparatus of my first mentioned application with a separate solids receiving and separating chamber, whereby sewage clarification is still further improved. My present invention relates to the more complete treatment of sewage, preferably utilizing the apparatus and processes disclosed in my two said mentioned applications.

A general object of my invention is to provide an improved apparatus and method for sewage purification.

A particular object of my invention is to improve the treatment or handling of sewage sludge or solids obtained from a clarification step prior to introduction thereof into a digestion apparatus or step.

Another object of my invention is to provide an improved combination or relation of steps in sewage purification.

Other objects of the invention will be apparent from the description and claims which follow.

Ordinary sewage contains considerable amounts of suspended and colloidal organic matter, which not only is removed from the sewage liquor with great difficulty, but which is unstable and readily becomes putrefactive. It is very necessary in sewage plant operation to carefully control all factors and conditions of the plant in order to prevent undesirable putrefaction in some stage of the process or part of the apparatus. There are ordinarily two phases to the biological treatment of sewage: the aerobic purification of clarified sewage liquor; and the anaerobic digestion of separated sewage sludge. The sewage liquor, which is ordinarily returned to a watercourse, can best be purified under aerobic conditions. It is desirable and customary, prior to the aerobic biological purification of sewage liquor, to remove as much as practicable of the solids suspended therein. The ordinary sewage treatment plant, therefore, utilizes a clarifying chamber to sediment as large a proportion as possible of the solids in raw sewage. The liquor is then passed to an aerobic biological purification step and the settled solids are removed for anaerobic digestion. The aerobic biological purification ordinarily takes the form either of a trickling filter treatment or an activated sludge treatment.

In either event it is highly desirable that the liquid undergoing treatment be as fresh and aerobic in character as possible. Ordinarily, the biological treatment step is followed by a second sedimentation step before the clarified liquid is finally discharged to waste, and the sludge from the second clarification step is either returned to the biological treating step, passed directly or indirectly to a digester, or both. It is, therefore, evident that a very important factor in sewage treatment is the maintenance of aerobic conditions throughout the handling of both the sewage liquid and the solids until these enter the digester, and one of the objects of my invention is to provide improved apparatus and method of operation to this end.

The suspended organic solids present in sewage do not settle readily. The size of the customary settling basin is limited by the necessity of avoiding such a long retention time for either the liquid or solids as will permit septic conditions arising. Because of this, clarification in such basins is very incomplete, usually only about half the suspended matter being removed. This naturally increases the load or work to be done in the following step where the liquid is biologically treated. I am proposing a more rapid and, at the same time, more complete clarification. This affects the subsequent biological step by reducing the load. This also has effects elsewhere as will become apparent.

The solids that settle in the ordinary clarifier are retained therein to compact and dewater as much as may be, before transferring them to the digester, so as to reduce the necessary size and cost of the latter. These solids are however highly putrescible and consequently cannot be retained as long as is desirable for compacting purposes. I am proposing means whereby these solids may be retained a shorter time in the clarifier and yet reach the digester in highly compacted form. At the same time, I improve conditions in the clarifier and biological step by providing an apparatus and operation such that the supernatant liquid displaced from the digester by the entering solids is not only smaller in amount but emerges as a small and continuous stream. Heretofore, the solids settling in the clarifier have usually been pumped to the digester periodically (once or twice a day), being delivered into the digester at a lower level and displacing a corresponding volume of liquid from the upper part thereof. This displaced supernatant liquid is highly polluted with organic matter, both dissolved and suspended, and is in an anaerobic condition and therefore is unfit to be discharged to waste. It is commonly returned into the purification process, usually into the clarification step, ahead of the biological step, and coming, as it does, in slugs of considerable volume, and because of its nature it tends to upset the aerobic condition in these steps and give rise to difficulties. Obviously this highly septic supernatant when mixed with the sewage and fresh sludge in the clarifier (which it is necessary to maintain in an aerobic condition but in which solids may be held for a prolonged period away from available oxygen) rapidly promotes septicity and therefore upsets the efficient operation of the process. These upsets and difficulties are avoided in my improvement. In my process the supernatant liquor from the digester is returned to the clarifier in a continuous small stream so that the volume of supernatant to be treated in the clarifier is always very small. Also, as the supernatant is displaced by sludge solids containing less liquid (due to the second thickening hereinafter described), the total amount of supernatant returned is less than heretofore, so that the total amount of anaerobic matter returned is smaller as well as being spread over a long period of time. If, as is preferred, the clarifier be of the type disclosed in my copending application entitled Sewage clarification, Serial No. 403,861, the improvements of my process are more pronounced as the sludge is separated from the liquid in such a short time and is so promptly removed from the process that septicity does not have a chance to develop in the sewage undergoing treatment.

It will be apparent from the preceding that I am contemplating improvements in individual steps of process and in apparatus that while applicable and useful separately, nevertheless, may weave together and have broad intereffects. So far I have referred only to steps and apparatus that precede or parallel the biological treatment with which they relate. I have in mind, however, relations of process and apparatus of subsequent steps that have similar relations not only among themselves but also with those already spoken of. It will thus become apparent that my invention not only comprises improvement in steps but also in the interrelations of individual steps and of the process as a whole.

In my first mentioned copending application I disclose an apparatus and method for separating sewage solids from sewage liquor in a small fraction of the time heretofore thought necessary, and at the same time for securing a much greater degree of solids removal than heretofore possible. In the second above mentioned copending application I have combined such apparatus with a separate solids receiving and separating chamber, which may be associated with a digester, wherein slurry from the clarification apparatus is retained for a short period, a major portion of the slurry solids being separated therefrom and liquid being returned to the clarification apparatus for further clarification.

The instant application discloses a variety of methods of combining the apparatus and methods of the two above mentioned applications into a unified sewage treatment plant. The present invention relates to preferred flow systems which can be associated with the apparatus of said copending applications. The present invention includes a removal of solids in a clarification chamber, continuously passing a portion of the sludge therein into a quiescent solids receiving and separating chamber for a partial or complete clarification, and returning the liquid therefrom to the clarification apparatus. Preferably, the clarification chamber of the present invention will be of a type disclosed in my first mentioned copending application, which separates solids by means of reaction in a turbulent slurry, but an old type of sedimentation basin can be used. In view of the fact that the liquid from the separating step is returned to the clarifying apparatus, it is not necessary that complete separation of the solids and liquid be secured in the solids receiving chamber. I have found that this method, disclosed in my second copending application, is particularly valuable when combined with different flow systems herein mentioned. The present invention is concerned with preferred types of flow systems suitable for use with my copending applications.

Preferred embodiments of my present invention are shown in the accompanying drawings which form a part of this specification, and in which like reference characters in the several figures designate similar elements.

Figure 1 is a diagrammatic plan view and flow sheet of a sewage treatment plant disclosing one of the embodiments of my invention.

Figure 2 is a diagrammatic plan view and flow sheet of another embodiment of my invention.

Figure 3 is a diagrammatic plan of a still further embodiment of my invention.

Figure 4 is a diagrammatic plan of further embodiments of my invention.

Figure 5 is a cross-sectional view of a preferred form of a solids concentrating chamber used in connection with my invention.

Referring first to the sewage plant shown in Figure 1, it will be seen that raw sewage to be treated enters the system through an influent sewage line 10. Ordinarily, incoming raw sewage is first passed through a grit chamber 11, where the rate of flow is briefly reduced in order to cause the depositing of heavy solids, such as rough gravel, metal objects, etc. Sewage then passes through a conduit 12 into a clarification chamber 13. The clarifier preferably will be of the type described in my above mentioned copending application, Serial No. 403,861. Associated with the clarifier is a solids receiving and storage chamber, shown in the figure as a digester 14, with a small solids separating chamber 15, superposed upon the top thereof. It will be understood that any type of storage chamber can be used and that a digester is illustrated as a specific example. An enlarged cross-sectional view of such a solids separating chamber 15 is shown in Figure 5. The solids separating chamber, or as it may be called "solids concentrating chamber" is preferably placed on the roof of the digester 14 and comprises side walls 92 and a steeply sloping bottom 93. The lower portion of the bottom is cut away to form a constantly open communication 94 between the chamber or pocket 15 and the top of the digester 14. Preferably a baffle means 95 is placed below the constantly open communication 94 to cause sewage gas rising in the digester to be directed to a gas chamber 96 for collecting gas resulting from digestion. Preferably the gas dome 96 will be higher than the liquid level of the solids concentrating chamber 15, in order to prevent the possibility of sewage getting into the gas removal line 97 leading from the gas dome 96. Slurry or sludge, as the case may be, from the clarifier 13, is withdrawn through a slurry conduit 16, and preferably passes into the solids receiving and separating chamber 15, where the solids settle and pass into the digester 14. It is possible to pass the slurry or sludge directly into the digester and withdraw partly clarified liquid through the small chamber, but I prefer the arrangement shown. Clarified or partly clarified liquor is returned through a return conduit 17 to the clarifier 13. This return conduit can pass directly into the slurry circulation within the clarifier, or it can be connected to the clarifier influent conduit 12, as shown. Solids, such as digested sludge, can be removed from the storage chamber 14, as desired through a sludge conduit 18.

Clarified sewage is conducted from the clarifier 13 by a conduit 19 and discharged into a biological sewage purification device 20. The biological treating device can comprise either a trickling filter or an aerator, both of which are well known in the art. After biological purification, the liquid, with solids which have been aggregated or collected in the biological treatment, passes through another conduit 21 to a second clarification chamber 22. The second clarifier can be either the apparatus shown in my copending application, or it can be any other desired form of clarifying apparatus. After clarification in the secondary clarifier 22, liquid is discharged to waste through an effluent 23. Sludge or settled solids collected in the second clarifier 22, is removed through a conduit 24, and passed to the digester 14, or preferably to the solids separating pocket 15 associated therewith. Obviously the various conduits described will be supplied with necessary pumps, not shown, for maintaining the necessary flow through the conduits where it is not secured by gravity. The use of such pumps will be obvious to those skilled in the art and need not be described.

The operation of this embodiment will be readily understood by those familiar with the art. Raw sewage passes into the treating system through the conduit 10. It first flows through the grit removal chamber 11, where heavy inorganic solids are removed. Sewage then flows into the primary clarifier 13, where as large a proportion as possible of the suspended, colloidal and dissolved solids are removed. The liquid portion of the sewage then flows into the biological treating chamber 20, where it is either aerated under the activated sludge process or filtered in the plant which utilizes a trickling filter. The effluent liquid from the biological treating chamber, containing biologically treated solids, passes through the conduit 21 into the secondary clarifier where a final separation of liquid and solids is accomplished. The clarified sewage passes through the conduit 23 to waste. Solids separated in the primary clarifier are passed into a solids holding chamber, such as the digester 14. I prefer to flow the sludge into the quiescent solids receiving chamber 15, placed on the top of the digester 14, whereby a partial or complete separation of solid particles and liquid is accomplished, the solids falling into the digester and the liquid being returned to the primary clarifier, as through the conduit 17. In this embodiment I also pass the sludge accumulated in the secondary clarifier 22, into the digester 14, as through the conduit 24. The liquid content of the sludge from both clarifiers is passed to the primary clarifier after the separation of a major part of the solids therefrom. It is contemplated that a continuous, or substantially continuous, flow of sludge or slurry will pass from the clarifier 13 to the solids concentrating or thickening chamber 15 and that the clarified or partially clarified liquor will be continuously passed back into the clarifier. It is, of course, known that anaerobic conditions are maintained in the digester and that it is desired to maintain aerobic conditions in the clarifiers, 13 and 22, and in the biological treating apparatus 20. I contemplate that the flow of solids through the separating or thickening chamber 15 be substantially constant in order that aerobic conditions may be maintained therein as I have found that better results are secured if that is done. Preferably the conduit 16 will enter the solids separating or thickening chamber 15, adjacent one end thereof and preferably at the top of the chamber as at 98. From the other end of the said thickening chamber the liquid return conduit 17 leads to the sewage influent 12 leading to the clarifier. Preferably a vertical baffle 101 will be interposed between the inlet 98 and the outlet of the concentrating chamber to prevent short-circuiting of flow through the chamber.

As used herein, the term "continuous" includes not only an uninterrupted flow but also an intermittent flow at such frequent periods that the effect is that of a substantially continuous flow. In many installations a literally continuous flow would be too small to be economical so that it would be better to have a large number of larger intermittent flows at frequent intervals. For example, in some instances I have found that it is more practical to withdraw partially thickened sludge at five or ten minute intervals for periods of thirty to sixty seconds each. As contrasted with sludge withdrawals of once or twice a day, such frequent withdrawals can properly be classed as "continuous," and the term is used in the specification and claims in this sense.

In some instances, as where the biological treating device is a trickling filter, it may be desirable to pass freshly treated sewage directly back into the biological treatment chamber. This can be accomplished through bypassing a portion of the effluent from the biological treating step 20 back to the influent line 19. An arrangement for this flow system is shown in Figure 2. The plant is quite similar to that shown in Figure 1 as the grit chamber 11, the primary clarifier 13, the digester 14, the solids receiving and separating chamber 15, the biological treatment chamber 20, and the secondary clarifier 22, are arranged in the same order. The difference between the embodiments of Figure 2 and Figure 1 lies in the conduit arrangement of the apparatus and the method of utilizing the effluent from the biological treating chamber. A portion of the effluent from the biological treating chamber 20 will be withdrawn through a filter return conduit 30 and passed into the filter influent conduit 19, leading from the primary clarifier 13 to the biological treating chamber. Sludge from the secondary clarifier 22 is passed into the solids receiving chamber 15, or the digester 14, the same as in the embodiment shown in Figure 1. The operation of such an embodiment will be readily understood by those familiar with the art.

The arrangement shown in Figure 3 is very similar to that shown in Figure 1, as the order of the treating devices can be identical. The only difference lies in the conduit system for handling effluent from the biological treating step. The embodiment of this figure is particularly well adapted for use in a sewage system utilizing an activated sludge treatment. In this flow system a portion of the sludge from the secondary clarifier 22 is returned to the biological treating step for use there. This sludge return can be accomplished by means of a conduit 35 which is shown discharging into the clarified liquid conduit 19 from the primary clarifier 13 to the biological treating chamber 20, but it could, of course, discharge directly into the latter chamber. In a process of this kind there is a surplus of sewage solids discharged from the biological treating chamber over that required therein. This excess sludge can be separated in the secondary clarifier 22, along with that required for seeding the biological treating chamber, and part passed back into the system, as by the conduit 35, and part otherwise disposed of as shown in Figure 4 in which the excess sludge can be either passed to the digester 14, as by a conduit 43, or to the primary clarifier, as by a conduit 44. However, I prefer withdrawing the excess sludge prior to sedimentation in the secondary clarifier 22 and passing the excess sludge, with the liquid in which it is contained as it passes from the biological treating chamber 20 into the primary clarifier. I have found that by withdrawing an amount of effluent from the biological treating chamber 20 sufficient to remove the excess sludge into the primary clarifier 13, as by a conduit 36, very beneficial results are secured. The return of fresh biologically treated liquid to the primary clarifier 13 while still highly aerobic and carrying highly active sludge, assists in maintaining aerobic conditions therein and in more quickly separating the solids from the sewage.

Figure 4 discloses various other variations of the liquid flow systems above described. The major treating devices, comprising the grit removal chamber 11, the primary clarifier 13, the digester 14, the solids receiving pocket 15, the biological treating step 20, the secondary clarifier 22, are arranged in the same manner as in the other figures. Sewage passes into the system through the raw sewage conduit 10. The conduit arrangement for passing sewage liquid through the grit removal chamber 11, the primary clarifier 13, the biological treating chamber 20, and into the secondary clarifier 22, is likewise the same as in the previous cases. Completely treated sewage is discharged to waste through the waste conduit 23. Also sewage solids from the primary clarifier are passed into the digester, as through the conduit 16, and partly clarified liquid is returned into the primary clarifier, as through the conduit 17, which arrangement is also similar to that shown in other figures. I may provide a conduit, such as 40, for removing a portion of the completely treated liquid from the waste conduit 23. By a suitable valve arrangement such withdrawn treated liquid can be passed into the biological treating step, as through a branch conduit 42, which return may be highly beneficial as is known in the prior art, or it can be (although there is no particular advantage in so doing) returned into the digester, as through a second branch conduit 43, or into the primary clarifier, as through a third branch conduit 44. I may also provide a conduit 41 for withdrawing a portion of the biologically treated liquid from the conduit 21. Such withdrawn liquid, which would contain suspended solids from the biological treating step, can be returned to the biological treating step, as through the first branch conduit 42, or return to the primary clarifier, as through the third branch conduit 44, both of which returns secure highly beneficial results as is known in the prior art, or it could be passed into the digester as through the second branch conduit 43, although this probably would not be used as it would result in the introduction of too much liquid into the concentrating chamber 15. Likewise, sludge withdrawn from the secondary clarifier through the secondary sludge conduit 24 can be passed into the biological treating step, as through the first branch conduit 42, into the digester, as through the second branch conduit 43, or into the primary clarifier, as through the third branch conduit 44. It will be obvious that the flows above mentioned into the digester 14 will preferably be into the solids concentrating chamber 15, and thence into the digester, rather than directly into the digester.

Many examples could be given of various arrangements which can be made from a plant such as illustrated in Figure 4. For example, all of the sludge from the secondary clarifier can be passed into the primary clarification chamber 13, by passing through the secondary sludge removal conduit 24, and the third branch conduit 44.

Another example would be a system in which a portion of the completely treated and clarified liquid is withdrawn from the waste conduit 23 and returned to the biological treating chamber 20, as through the conduit 40 and the first branch conduit 42, while the sludge from the secondary clarifier 22 will be passed into the digester through the secondary sludge removal conduit 24 and the second branch conduit 43, or into the primary clarifier, as through the secondary sludge removal conduit 24 and the third branch conduit 44.

Another example would be with withdrawal of sludge from the secondary clarifier 22, through the secondary sludge removal conduit 24, passing a portion through the biological treating chamber 20, through the first branch conduit 42, and passing the excess sludge either into the digester through the second branch conduit 43 or into the primary clarifier through the third branch conduit 44.

Another arrangement would be to pass a portion of the biologically treated sewage into the primary clarifier, as through the conduit 41 and the third branch conduit 44, and removing all of the sludge from the secondary clarifier 22 into the degister 14, as by the secondary sludge removal conduit 24 and the second branch conduit 43.

In another embodiment the sludge from the secondary clarifier 22 is passed into the biological treating chamber 20, as through the secondary sludge removal conduit 24 and the first branch conduit 42. A predetermined portion of the biologically treated liquid is removed through the conduit 41 and the second branch conduit 43 into the digester. The amount of excess can be determined by observation and the amount of return can be calculated so as to equal an amount of liquid which would carry the solids in excess over that required for the biological treating step.

A further example, similar to the preceding one, would be the separation of solids from the biologically treated liquid in the secondary clarifier 22 and the passing of the sludge therefrom partly into the biological treating step, as through the secondary sludge removal conduit 24 and the first branch conduit 42 and partly into the primary clarifier through the second branch conduit 43.

Many further examples of flow systems could be given, but it is believed unnecessary to illustrate the invention. For example, in many installations the liquid may be clarified but need not be purified as by biological treatment. In such installations a filter can replace the biological treating chamber 20. Such filters are well known in the art and comprise sand filters, coal filters, and many other filters in forms that remove solids but do not effect a biological purification. In such installations the wash water used on the filter can be passed either into the primary clarifier or into the digester, or otherwise be disposed of.

It will readily be understood that many modifications and variations of the invention hereinbefore set forth may be made by persons skilled in the art without departing from the spirit and scope hereof. For example, in many installations it may be desirable to insert a rapid filter in the conduit 19, from the clarifier 13, to the biological treatment chamber 20, for further clarifying sewage prior to its treatment in the biological treating step. Or, in some installations it might be desirable to reactivate the sludge withdrawn from the secondary clarifier before passing it into the biological treating step. In some other installations the secondary clarifier might be a rapid filter or a clarifying apparatus such as disclosed in my copending application, or the liquid from the clarifier might be passed through a filter medium prior to disposal. Accordingly, the appended claims are to be given an interpretation commensurate with the novelty herein described and as broad as may be permitted by the prior art.

I claim:

1. A sewage treating apparatus comprising a clarification chamber, a biological treating chamber, a sludge digester, a gas outlet from the top of said digester, a solids concentrating chamber adjacent the top of said digester and so located as to maintain the digester full of liquid but not to overflow the gas outlet, conduit means for delivering raw sewage into said clarification chamber, conduit means for delivering clarified sewage from said clarification chamber to said biological treating chamber, an effluent conduit from said biological treating chamber, conduit means for delivering sewage solids from said clarification chamber to said solids concentrating chamber, outlet means leading from a level in said concentrating chamber below the level of said gas outlet discharging into said clarification chamber, and a constantly open communication between the lower portion of said solids concentrating chamber and the digester affording egress for solids from the concentrating chamber into the digester and ingress of supernatant into the concentrating chamber from the digester.

2. The apparatus of claim 1 wherein the biological treating chamber comprises a trickling filter.

3. The apparatus of claim 1 wherein the biological treating chamber comprises an activated sludge aerator.

4. A sewage treating apparatus comprising a first clarification chamber, a biological treating chamber, a second clarification chamber, a sludge digester, a gas outlet from the top of said digester, a solids concentrating chamber adjacent the top of said digester, conduit means for delivering raw sewage into said first clarification chamber, conduit means for delivering clarified sewage effluent from said first clarification chamber to said biological treating chamber, conduit means for delivering biologically treated sewage from said biological treating chamber to said second clarification chamber, a clarified liquid effluent conduit from said second clarification chamber, conduit means for delivering sewage solids from each of said clarification chambers to said solids concentrating chamber, conduit means leading from a level in said concentrating chamber below the level of said gas outlet and discharging into said first clarification chamber, and a constantly open communication between the lower portion of said solids concentrating chamber and the digester, whereby the liquid level of the digester is controlled by the liquid level in said concentrating chamber.

5. A sewage treatment apparatus comprising a first clarification chamber, a biological treating chamber, a second clarification chamber, a sludge digester, a cover on said digester, a solids concentrating chamber at the level of the top portion of said digester, conduit means for delivering raw sewage into said first clarification chamber, conduit means for delivering clarified sewage from said first clarification chamber to said biological treating chamber, conduit means for delivering biologically treated sewage from said biological treating chamber to said second clarification chamber, conduit means for delivering clarified biologically treated sewage from said second clarification chamber to waste, conduit means for delivering sewage solids from said first clarification chamber to said solids concentrating chamber, conduit means leading from a level in said solids concentrating chamber below the level of the uppermost portion of the cover on said digester and discharging into said first clarification chamber, a constantly open communication between the lower portion of said solids concentrating chamber and the upper portion of the digester, conduit means for delivering a portion of biologically treated liquid to said first clarification chamber, and conduit means for delivering separated solids from said second clarification chamber to said biological treating chamber.

6. The apparatus of claim 5 wherein the biological treating chamber comprises an activated sludge aerator.

7. A sewage treating apparatus comprising a first clarification chamber, a biological treating chamber, a second clarification chamber, a sludge digester, a gas outlet from the top of said digester, a solids concentrating chamber adjacent the top of said digester, conduit means for delivering raw sewage into said first clarification chamber, conduit means for delivering clarified sewage from said first clarification chamber into said biological treating chamber, conduit means for delivering effluent from said biological treating chamber to said second clarification chamber, an effluent conduit from said second clarification chamber to waste, conduit means for delivering sewage solids from said first clarification chamber to said solids concentrating chamber, conduit means leading from a level in said solids concentrating chamber below the level of the gas outlet and discharging into said first clarification chamber, a solids outlet from the solids concentrating chamber discharging into said digester, conduit means for returning a portion of the effluent from said biological treating chamber into the conduit means for delivering clarified sewage from said first clarification chamber into said biological treating chamber, and conduit means for delivering sewage solids from said second clarification chamber into said solids concentrating chamber.

8. The apparatus of claim 7 wherein the biological treating chamber comprises a trickling filter.

9. A sewage treatment process which comprises the steps of separating raw sewage into a clarified liquid and a sludge containing solids from said sewage in a first clarification zone, subjecting the clarified sewage to biological treatment in a biological treatment zone, separating the biologically treated sewage into a clarified liquid and a sludge containing solids in a second clarification zone, flowing the clarified liquid from the second clarification zone to waste, passing the sludge separated from sewage liquor in both of said clarification zones into a quiescent solids concentrating zone, permitting solids to settle from liquid in said sludge in said quiescent zone, continuously discharging the settling solids by gravity into a digestion zone, continuously returning into said quiescent zone an amount of supernatant liquor from said digestion zone equal to the solids so discharged and flowing liquid from said quiescent zone to said first clarification zone.

10. A sewage treatment process which comprises the steps of separating raw sewage into clarified liquid and a sludge containing solids from said sewage in a first clarification zone, biologically treating the clarified liquid in a biological treating zone, returning a portion of said biologically treated sewage issuing from the biological treating zone back into such zone, and flowing the balance of said biologically treated liquid into a second clarification zone, separating the biologically treated sewage in said second clarification zone into a clarified liquid and a sludge containing solids, flowing the clarified liquid from the second clarification zone to waste, passing the sludge separated from sewage liquor in both of said clarification zones substantially continuously into a quiescent solids concentrating zone, permitting solids to settle from liquid in said sludge in said quiescent zone, discharging the solids by gravity into a digestion zone and thereby simultaneously therewith displacing an equal amount of supernatant liquor from said digestion zone into said quiescent zone, and flowing liquid from said quiescent zone to said first clarification zone.

11. A sewage treatment process which comprises the steps of separating raw sewage into a clarified liquid and a sludge containing solids from said sewage in a first clarification zone, biologically treating the clarified liquid in a biological treating zone, passing a predetermined portion of the biologically treated liquid to a second clarification zone and passing the balance into said first clarification zone, separating the biologically treated sewage in the second clarification zone into a clarified liquid and a sludge containing solids, flowing the clarified liquid from the second clarification zone to waste, flowing the sludge from the first clarification zone substantially continuously into a quiescent solids concentrating zone, separating solids from liquid in said sludge in said quiescent zone, discharging the solids by gravity into a digestion zone completely filled with sewage sludge and thereby simultaneously displacing an equal amount of supernatant liquor from said digestion zone into said quiescent zone, returning liquid from said quiescent zone into said first clarification zone, and flowing sludge from said second clarification zone into said biological treating zone.

12. In a sewage treating apparatus including the combination of a first clarifying unit, a biological treatment unit receiving clarified sewage from said first clarifying unit, a final clarifying unit receiving biologically treated sewage from said biological treatment unit, and a digester for the digestion of solids separated in the treatment of sewage in said clarifying units, the improvement which comprises a solids thickening chamber associated with said digester and so constructed and arranged as to clarify a mixture of partially thickened solids from the clarifying units and supernatant liquor from the digester, sludge conduits from said clarifying units to said solids thickening chamber for delivering thickened solids from said clarifying units into said thickening chamber, a communication affording passage for thickened solids from said thickening chamber to said digester and for supernatant from said digester into said thickening chamber, and means for passing the partially clarified overflow from the upper part of said thickening chamber into said first clarifying unit.

13. A sewage treating apparatus comprising a first sewage clarifier, a biological treating unit, a second sewage clarifier, conduits so interconnecting said three elements that sewage undergoing treatment flows through them in the sequence given, a digester, a cover on said digester, a solids thickening and supernatant liquid clarifying chamber superposed on said digester, sludge outlet conduits leading from said first and second clarifiers to said solids thickening chamber, a return conduit leading from the upper part of said solids thickening chamber to one of the said clarifiers, and an open communication between the bottom of said solids thickener and the top of said digester, said solids thickening chamber and said digester being so constructed and arranged that the liquid level established in said solids thickening chamber by the level of the return conduit leading therefrom is lower than the highest level of the cover of the sludge digester.

14. A sewage treatment process which comprises the steps of separating sewage in a relatively large preliminary clarification zone into a clarified liquid and a liquid sludge containing solids from said sewage, flowing the clarified liquid to a secondary treatment and thence to waste, flowing the liquid sludge into a relatively small secondary clarification zone wherein quiescent conditions are maintained, separating solids from liquid in said sludge in said secondary clarification zone, continuously discharging the solids separated in said secondary clarification zone by gravity into a digestion zone and thereby displacing an equal amount of supernatant liquor from the upper portion of said digestion zone into said secondary clarification zone, and returning liquid from the upper part of said secondary clarification zone to said preliminary clarification zone.

15. Sewage treating apparatus comprising in combination a first liquid separation and solids thickening chamber, a raw sewage inlet to said chamber, a clarified sewage treating apparatus, a communication for flow of clarified sewage from said first liquid separation and solids thickening chamber to said treating apparatus, a treated sewage outlet from said treating apparatus, a digester, a gas outlet from said digester, a digested solids outlet from said digester, a second liquid separation and solids thickening chamber superposed upon said digester, a communication for the flow of partially thickened solids from said first liquid separation chamber to said second liquid separation chamber, an open communication for thickened solids from the lower portion of said second separation chamber into said digester, and a liquid return conduit leading from said second separation chamber at the level of the upper surface of liquid in the digester, and discharging into said first liquid separation and thickening chamber.

WALTER H. GREEN.